United States Patent
Dolby et al.

(10) Patent No.: US 8,141,054 B2
(45) Date of Patent: Mar. 20, 2012

(54) DYNAMIC DETECTION OF ATOMIC-SET-SERIALIZABILITY VIOLATIONS

(75) Inventors: Julian T. Dolby, Riverdale, NY (US); Christian J. Hammer, Kinding (DE); Frank Tip, Ridgewood, NJ (US); Mandana Vaziri-Farahani, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 1198 days.

(21) Appl. No.: 11/835,685

(22) Filed: Aug. 8, 2007

(65) Prior Publication Data

US 2009/0044174 A1    Feb. 12, 2009

(51) Int. Cl.
G06F 9/44 (2006.01)
G06F 9/45 (2006.01)

(52) U.S. Cl. ........ 717/130; 717/131; 717/154; 717/155; 717/156; 717/157; 717/158

(58) Field of Classification Search .......... None
See application file for complete search history.

(56) References Cited

U.S. PATENT DOCUMENTS

2004/0039964 A1 * 2/2004 Russell et al. .................. 714/25

OTHER PUBLICATIONS

Hammer, et al., "Dynamic Detection of Atomic-Set-Serializability Violations," IBM T.J. Watson Research Center, Yorktown Heights, NY, Apr. 4, 2007.

Agarwal, et al., "Optimized Run-Time Race Detection and Atomicity Checking Using Partial Discovered Types," in *ASE '05: Proceedings of the 20th IEEE/ACM International Conference on Automated Software Engineering*, Nov. 7-11, 2005, Long Beach, CA, pp. 233-242, ACM Press, New York, NY, Copyright 2005 ACM 1-58113-993-4/05/0011

Artho, et al., "High-level Data Races," *Journal on Software Testing, Verification and Reliability (STVR)*, 2003, pp. 207-227, 13(4).

Artho, et al., "Using Block-Local Atomicity to Detect Stale-Value Concurrency Errors," In *Automated Technology for Verification and Analysis (ATVA '04)*, 2004, pp. 150-164, LNCS 3299, Springer-Verlag, Berlin Heidelberg.

Balaban, et al., "Refactoring Support for Class Library Migration," in OOPSLA '05: *SIGPLAN Not.*, Oct. 16-20, 2005, San Diego, CA, pp. 265-279, 40(10), ACM Press, New York, NY, Copyright 2005 ACM 1-59593-031-0/05/0010.

Burrows, et al., "Finding Stale-Value Errors in Concurrent Programs," *Concurrency and Computation: Practice and Experience*, 2004, pp. 1161-1172, 16(12).

(Continued)

*Primary Examiner* — Chuck Kendall
(74) *Attorney, Agent, or Firm* — Jose Gutman; Fleit Gibbons Gutman Bongini & Bianco PL

(57) ABSTRACT

A method, an information processing system, and a computer readable medium, are used to detect atomic-set serializability violations in an execution of a program. A set of classes associated with a program to be analyzed is identified. The set of classes include a set of fields. At least one subset of fields in the set of fields in the identified classes is selected. A set of code fragments associated with an execution of the program is selected. Data accesses in the selected set of code fragments are observed. It is determined if the selected set of code fragments is serializable for each selected subset of fields.

20 Claims, 7 Drawing Sheets

OTHER PUBLICATIONS

Flanagan, et al., "Atomizer: A Dynamic Atomicity Checker for Multithreaded Programs," In *POPL '04: Proceedings of the 31st ACM SIGPLAN-SIGACT Symposium on Principles of Programming Languages*, Jan. 14-16, 2004, Venice, Italy, pp. 256-267, ACM Press, New York, NY, Copyright 2004 ACM 1-58113-729-X/04/0001.

Flanagan, et al., "Type Inference for Atomicity," In *TLDI '05: Proceedings of the 2005 ACM SIGPLAN International Workshop on Types in Languages Design and Implementation*, Jan. 10, 2005, Long Beach, CA, pp. 47-58, ACM Press, New York, NY, Copyright 2005 ACM 1-58113-999-3/05/0001.

Flanagan, et al., "A Type and Effect System for Atomicity," In *PLDI '03: Proceedings of the ACM SIGPLAN 2003 Conference on Programming Language Design and Implementation*, Jun. 9-11, 2003, San Diego, CA, pp. 338-349, ACM Press, New York, NY, Copyright 2003 ACM 1-58113-662-5/03/0006.

Flanagan, et al., "Types for Atomicity," In *TLDI '03: Proceedings of the 2003 ACM SIGPLAN International Workshop on Types in Languages Design and Implementation*, Jan. 18, 2003, New Orleans, LA, pp. 1-12, ACM Press, New York, NY, Copyright 2003 ACM 1-58113-649-8/03/0001.

R.J. Lipton, "Reduction: A Method of Proving Properties of Parallel Programs," In *Commun. ACM*, Jan. 20-22, 1975, Palo Alto, CA, pp. 717-721, 18(12), ACM Press, New York, NY Copyright 1975.

Tucek, et al., "AVIO: Detecting Atomicity Violations via ACCESS Interleaving Invariants," In *ASPLOS '06: Proceedings of the Twelfth International Conference on Architectural Support for Programming Languages and Operating Systems*, Oct. 21-25, 2006, San Jose, CA, pp. 37-48, ACM Press, New York, NY, Copyright 2006 ACM 1-59593-451-0/06/0010.

Netzer, et al., "What Are Race Conditions? Some Issues and Formalizations," *ACM Letters on Programming Languages and Systems*, Mar. 1992, pp. 74-88, 1(1), ACM Press, New York, NY, Copyright 1992 ACM 1057-4514/92/0300-0074.

Sasturkar, et al., "Automated Type-Based Analysis of Data Races and Atomicity," In *PPoPP '05: Proceedings of the Tenth ACM SIGPLAN symposium on Principles and Practice of Parallel Programming*, Jun. 15-17, 2005, Chicago, IL, pp. 83-94, ACM Press, New York, NY, Copyright 2005 ACM 1-59593-080-9/05/0006.

Vaziri, et al., "Associating Synchronization Constraints with Data in an Object-Oriented Language," In *POPL '06: Conference Record of the 33rd ACM SIGPLAN-SIGACT Symposium on Principles of Programming Languages*, Jan. 11-13, 2006, Charleston, SC, pp. 334-345, ACM Press, New York, NY, Copyright 2006 ACM 1-59593-027-2/06/0001.

Von Praun, et al., "Static Detection of Atomicity Violations in Object-Oriented Programs," *Journal of Object Technology* (Special Issue: ECOOP 2003 workshop on FTfJP), Jun. 2004, pp. 103-122, 3(6).

Wang, et al., "Run-Time Analysis for Atomicity," In *Proceedings of the Workshop on Runtime Verification (RV '03)*, 2003, pp. 1-18, 89(2) of *Electronic Notes in Theoretical Computer Science*, Elsevier.

Wang, et al., "Accurate and Efficient Runtime Detection of Atomicity Errors in Concurrent Programs," In *PPoPP '06: Proceedings of the ACM SIGPLAN Symposium on Principles and Practice of Parallel Programming*, 2006, pp. 137-146, ACM Press, New York, NY.

Wang, et al., "Runtime Analysis of Atomicity for Multithreaded Programs," *IEEE Transactions on Software Engineering*, Feb. 15, 2006, pp. 93-110, 32(2), IEEEC0098-5589/06, IEEC Log No. TSE-0137-0704.

Ben-Asher, et al. "Noise Makers Need to Know Where to be Silent—Producing Schedules that Find Bugs", Nov. 13, 2005.

Gait, "A Probe Effect in Concurrent Programs," Software-Practice and Experience; Mar. 1986; vol. 16(3); pp. 225-233.

* cited by examiner

```
1  class Account {
2     int checking;
3     int savings;
4     synchronized void transfer(int n) {
5         checking += n;
6         Global . inc( )
7         savings -= n;
8         Global . inc( );
9     }
10 }
11
12 class Global {
13    static int cpCounter = 0;
14    static synchronized void inc( ) {
15        opCounter++;
16    }
17 }
```

FIG. 3

| | Interleaving Scenario | Description |
|---|---|---|
| 1. | $R_u(l)\ W_{u'}(l)\ W_u(l)$ | Value read is stale by the time an update is made in $u$. |
| 2. | $R_u(l)\ W_{u'}(l)\ R_u(l)$ | Two reads of the same location yield different values in $u$. |
| 3. | $W_u(l)\ R_{u'}(l)\ W_u(l)$ | An intermediate state is observed by $u'$. |
| 4. | $W_u(l)\ W_{u'}(l)\ R_u(l)$ | Value read is not the same as the one written last in $u$. |
| 5. | $W_u(l)\ W_{u'}(l)\ W_u(l)$ | Value written by $u'$ is lost. |
| 6. | $W_u(l_1)\ W_{u'}(l)\ W_u(L \setminus l) W_{u'}(l_2)$ | Memory is left in an inconsistent state. |
| 7. | $W_u(l_1)\ W_{u'}(l_2)\ W_u(l_2) W_{u'}(l_1)$ | same as above. |
| 8. | $W_u(l_1)\ R_{u'}(l)\ R_{u'}(L \setminus l) W_u(l_2)$ | State observed is inconsistent. |
| 9. | $R_u(l_1)\ W_{u'}(l)\ W_{u'}(L \setminus l) R_u(l_2)$ | same as above. |
| 10. | $R_u(l_1)\ W_{u'}(l_2)\ R_u(l_2) W_{u'}(l_1)$ | same as above. |
| 11. | $W_u(l_1)\ R_{u'}(l_2)\ W_u(l_2) R_{u'}(l_1)$ | same as above. |

FIG. 6

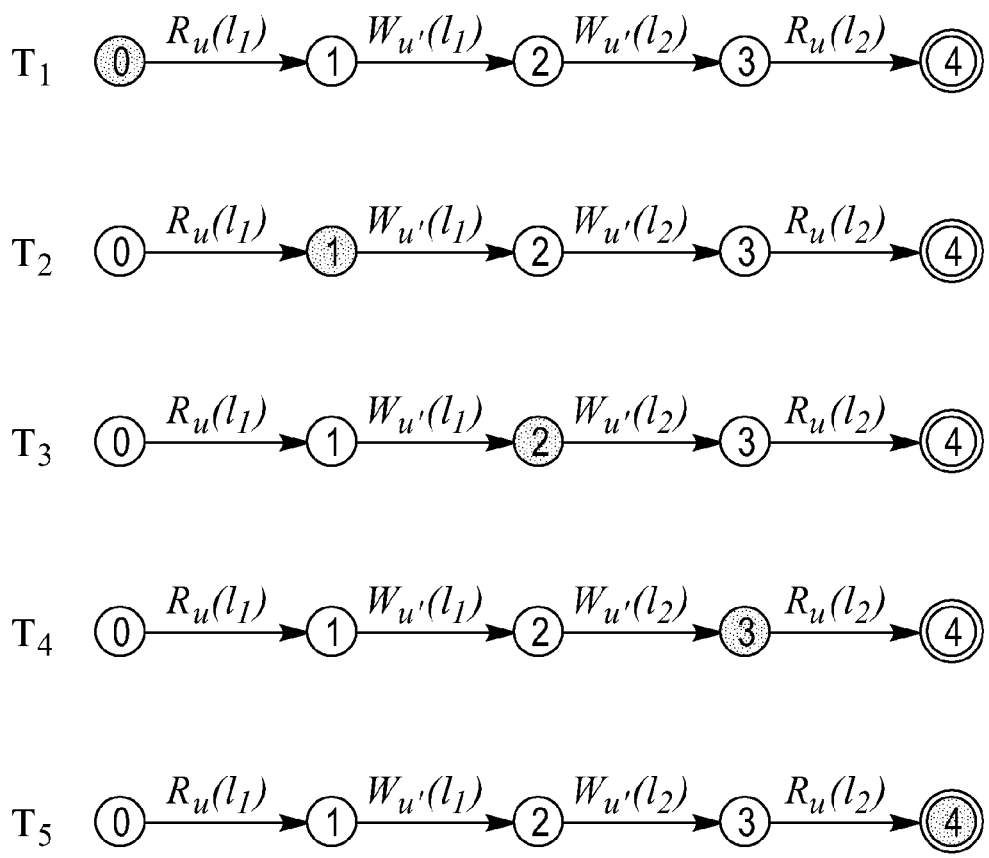

```
               x=3; y=2;
702 ─          fork;          ─ 704
    ↘                         ↙

//Unit of Work u1 :  //Unit of Work u3:
if (x+y+3<10)        if (x+y+4<10)
   x+=3                 y+=4
```

FIG. 7

$T_1$ ⓪ $\xrightarrow{R_u(l_1)}$ ① $\xrightarrow{W_{u'}(l_1)}$ ② $\xrightarrow{W_{u'}(l_2)}$ ③ $\xrightarrow{R_u(l_2)}$ ④

$T_2$ ⓪ $\xrightarrow{R_u(l_1)}$ ① $\xrightarrow{W_{u'}(l_1)}$ ② $\xrightarrow{W_{u'}(l_2)}$ ③ $\xrightarrow{R_u(l_2)}$ ④

$T_3$ ⓪ $\xrightarrow{R_u(l_1)}$ ① $\xrightarrow{W_{u'}(l_1)}$ ② $\xrightarrow{W_{u'}(l_2)}$ ③ $\xrightarrow{R_u(l_2)}$ ④

$T_4$ ⓪ $\xrightarrow{R_u(l_1)}$ ① $\xrightarrow{W_{u'}(l_1)}$ ② $\xrightarrow{W_{u'}(l_2)}$ ③ $\xrightarrow{R_u(l_2)}$ ④

$T_5$ ⓪ $\xrightarrow{R_u(l_1)}$ ① $\xrightarrow{W_{u'}(l_1)}$ ② $\xrightarrow{W_{u'}(l_2)}$ ③ $\xrightarrow{R_u(l_2)}$ ④

FIG. 8

DYNAMIC DETECTION OF ATOMIC-SET-SERIALIZABILITY VIOLATIONS

STATEMENT REGARDING FEDERALLY SPONSORED RESEARCH OR DEVELOPMENT

This invention was made with Government support under Contract No.: NBCH3039004 awarded by Defense Advanced Research Projects Agency (DARPA). The Government has certain rights in this invention.

FIELD OF THE INVENTION

The present invention generally relates to the field of information processing systems, and more particularly relates to detecting atomic-set serializability in concurrent processing systems.

BACKGROUND OF THE INVENTION

As multi-core systems are coming into general use, concurrency-related bugs are a more significant problem for mainstream programmers. The traditional correctness criterion for concurrent programs is the absence of data-races, which occur when two threads access the same shared variable, one of the accesses is a write, and there is no synchronization between them. In general, data-race freedom does not guarantee the absence of concurrency-related bugs. Therefore, different types of errors and correctness criteria have been proposed, such as high-level data races (See reference A listed below), stale-value errors (See references B and C listed below), and several definitions of serializability (or atomicity) (See references D-N listed below). According to these definitions of serializability, a schedule of read and write events performed by a collection of threads is serializable if it is equivalent to a serial schedule, in which each thread's transactions (or atomic sections) are executed in some serial order. These correctness criteria ignore the relationships between shared memory locations, such as invariants and consistency properties, and may not accurately reflect the intentions of the programmer for correct behavior.

Therefore a need exists to overcome the problems with the prior art as discussed above.

The following paragraphs list the references A-N cited above, all of which are incorporated by reference in their entirety. Reference A, C. Artho, K. Havelund, and A. Biere. High-level data races. *Journal on Software Testing, Verification and Reliability (STVR)*, 13(4):207-227, 2003; Reference B and C, respectively, C. Artho, K. Havelund, and A. Biere. Using block-local atomicity to detect stale-value concurrency errors. In *Automated Technology for Verification and Analysis (ATVA '04)*, number 3299 in LNCS, pages 150-164. Springer, 2004 and M. Burrows and K. R. M. Leino. Finding stale-value errors in concurrent programs. *Concurrency and Computation: Practice and Experience*, 16(12):1161-1172, 2004;

References D-H, respectively, C. Flanagan and S. Qadeer. A type and effect system for atomicity. In *PLDI '03: Proceedings of the ACM SIGPLAN 2003 conference on Programming language design and implementation*, pages 338-349, New York, N.Y., USA, 2003. ACM Press; C. Flanagan and S. Qadeer. Types for atomicity. In *TLDI '03: Proceedings of the 2003 ACM SIGPLAN international workshop on Types in languages design and implementation*, pages 1-12, New York, N.Y., USA, 2003. ACM Press; L. Wang and S. D. Stoller. Run-time analysis for atomicity. In *Proceedings of the Workshop on Runtime Verification (RV '03)*, 2003. Volume 89(2) of *Electronic Notes in Theoretical Computer Science*. Elsevier; C. Flanagan and S. N. Freund. Atomizer: a dynamic atomicity checker for multithreaded programs. In *POPL '04: Proceedings of the 31st ACM SIGPLAN-SIGACT symposium on Principles of programming languages*, pages 256-267, 2004; C. von Praun and T. R. Gross. Atomicity violations in object-oriented programs. *Journal of Object Technology*, 3(6):103-122, June 2004. Special issue: ECOOP 2003 workshop on FTfJP.

References I-N, respectively, R. Agarwal, A. Sasturkar, L. Wang, and S. D. Stoller. Optimized run-time race detection and atomicity checking using partial discovered types. In *ASE '05: Proceedings of the 20th IEEE/ACM international Conference on Automated software engineering*, pages 233-242, New York, N.Y., USA, 2005. ACM Press; C. Flanagan, S. N. Freund, and M. Lifshin. Type inference for atomicity. In *TLDI '05: Proceedings of the 2005 ACM SIGPLAN international workshop on Types in languages design and implementation*, pages 47-58, New York, N.Y., USA, 2005. ACM Press; A. Sasturkar, R. Agarwal, L. Wang, and S. D. Stoller. Automated type-based analysis of data races and atomicity. In *PPoPP '05: Proceedings of the tenth ACM SIGPLAN symposium on Principles and practice of parallel programming*, pages 83-94, New York, N.Y., USA, 2005. ACM Press; S. Lu, J. Tucek, F. Qin, and Y. Zhou. AVIO: Detecting atomicity violations via access interleaving invariants. In *Proceedings of the Twelfth International Conference on Architectural Support for Programming Languages and Operating Systems (ASPLOS'06)*, pages 37-48, San Jose, Calif., 2006; and L. Wang and S. D. Stoller. Runtime analysis of atomicity for multithreaded programs. *IEEE Transactions on Software Engineering*, 32(2):93-110, 2006; L. Wang and S. D. Stoller. Accurate and efficient runtime detection of atomicity errors in concurrent programs. In *Proceedings of the ACM SIGPLAN Symposium on Principles and Practice of Parallel Programming, (PPoPP '06)*, pages 137-146, New York, N.Y., 2006

SUMMARY OF THE INVENTION

In previous work, M. Vaziri, F. Tip, and J. Dolby. Associating synchronization constraints with data in an object-oriented language. In *POPL '06: Conference record of the 33rd ACM SIGPLAN-SIGACT symposium on Principles of programming languages*, pages 334-345, 2006 (hereinafter referred to as "M. Vaziri"), which is hereby incorporated by reference in its entirety, a correctness criterion for concurrent systems was presented that takes such relationships into account. The criterion is based on atomic sets of memory locations that must be updated atomically, and units of work, fragments of code that preserve the consistency of the atomic sets when executed sequentially. Atomic-set serializability, the correctness criterion of one embodiment of the present invention, states that units of work are to be serializable for each atomic set they are declared on. In previous work, a set of problematic data access patterns was also presented whose absence guarantees atomic-set serializability.

According to various embodiments of the present invention, a method, an information processing system, and a computer readable medium, are used to detect atomic-set serializability violations in an execution of a program. The method includes identifying a set of classes associated with a program to be analyzed. The set of classes include a set of fields. At least one subset of fields in the set of fields in the identified classes is selected. In one embodiment, the at least one subset of fields is selected based on heuristic assumption. A set of code fragments associated with an execution of the program is selected. In one embodiment, the set of code fragments are selected based on heuristic assumption. Data accesses in the selected set of code fragments are observed. It is determined if the selected set of code fragments is serializable for each selected subset of fields.

In another embodiment, an information processing system for detect atomic-set serializability violations in an execution of a program is disclosed. The information processing system including a processor and a memory that is communicatively coupled to the processor. A program analyzer is communicatively coupled to the memory and the processor. The program analyzer is adapted to identify a set of classes associated with a program to be analyzed. The set of classes include a set of fields. At least one subset of fields in the set of fields in the identified classes is selected. A set of code fragments associated with an execution of the program is selected. Data accesses in the selected set of code fragments are observed. It is determined if the selected set of code fragments is serializable for each selected subset of fields.

In yet another embodiment, a computer readable medium comprising computer instructions for performing, with an information processing system, a method for detecting atomic-set serializability violations in an execution of a program is disclosed. The method includes identifying a set of classes associated with a program to be analyzed are identified. The set of classes include a set of fields. At least one subset of fields in the set of fields in the identified classes is selected. A set of code fragments associated with an execution of the program is selected. Data accesses in the selected set of code fragments are observed. It is determined if the selected set of code fragments is serializable for each selected subset of fields.

An advantage of the embodiments of the present invention is that violations of atomic-set serializability can be dynamically detected. Programmer-specified atomic sets of memory locations provide a flexible correctness criterion for synchronization of concurrent tasks that only requires serializability (atomicity) with respect to atomic sets rather than all of memory. The present invention checks for traditional data races (single-location atomic sets), standard notions of serializability (all locations in one set), and a range of options in between. The dynamic analysis performed by the present invention is based on a complete set of problematic patterns that characterize possible atomic-set-serializability violations. State machines are utilized by the present invention to track possible occurrences of these patterns in the program as it runs. The nature of these patterns enables an efficient implementation that does not need the entire execution trace. Moreover, the problematic data access patterns checked do not depend on specific synchronization constructs such as locks. The analysis can therefore be used in settings where existing approaches cannot, such as wait-free algorithms.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

FIG. 3 illustrates an example of a program;

FIG. 6 is a table illustrating problematic data access patterns;

FIG. 7 is a schematic diagram illustrating two program threads;

FIG. 8 is a schematic diagram illustrating a serializability violation for the threads of FIG. 7.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Example of a Computing Environment

Figure 1:
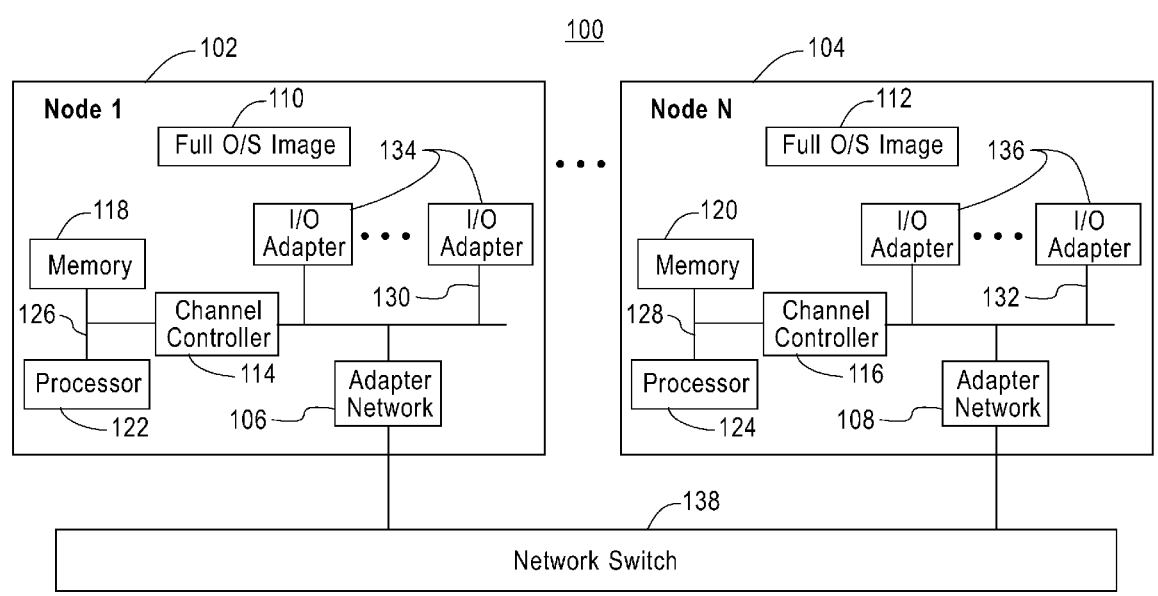
FIG. 1 is block diagram illustrating a computing environment, according to one embodiment of the present invention.

FIG. 1 is a block diagram illustrating an example of a computing environment according to an embodiment of the present invention. In one embodiment, the computing environment 100 of FIG. 1 is used to detect atomic-set serializability violations. It should be noted that the present invention can be scaled across multiple processing nodes such as in the computing environment of FIG. 1 or can reside at a single node.

In the illustrated embodiment, the computing environment 100 is a distributed system in a symmetric multiprocessing ("SMP") computing environment. The computing environment 100 includes processing nodes 102, 104 coupled to one another via network adapters 106 and 108. Each processing node 102, 104 is an independent computer with its own operating system image 110, 112; channel controller 114,116; memory 118,120; and processor(s) 122, 124 on a system memory bus 126, 128. A system input/output bus 130, 132 couples I/O adapters 134,136 and network adapter 106, 108. Although only one processor 122, 124 is shown in each processing node 102, 104, each processing node 102, 104 is capable of having more than one processor. Each network adapter is linked together via a network switch 138. In some embodiments, the various processing nodes 102, 104 are part of a processing cluster.

Information Processing System

Figure 2:
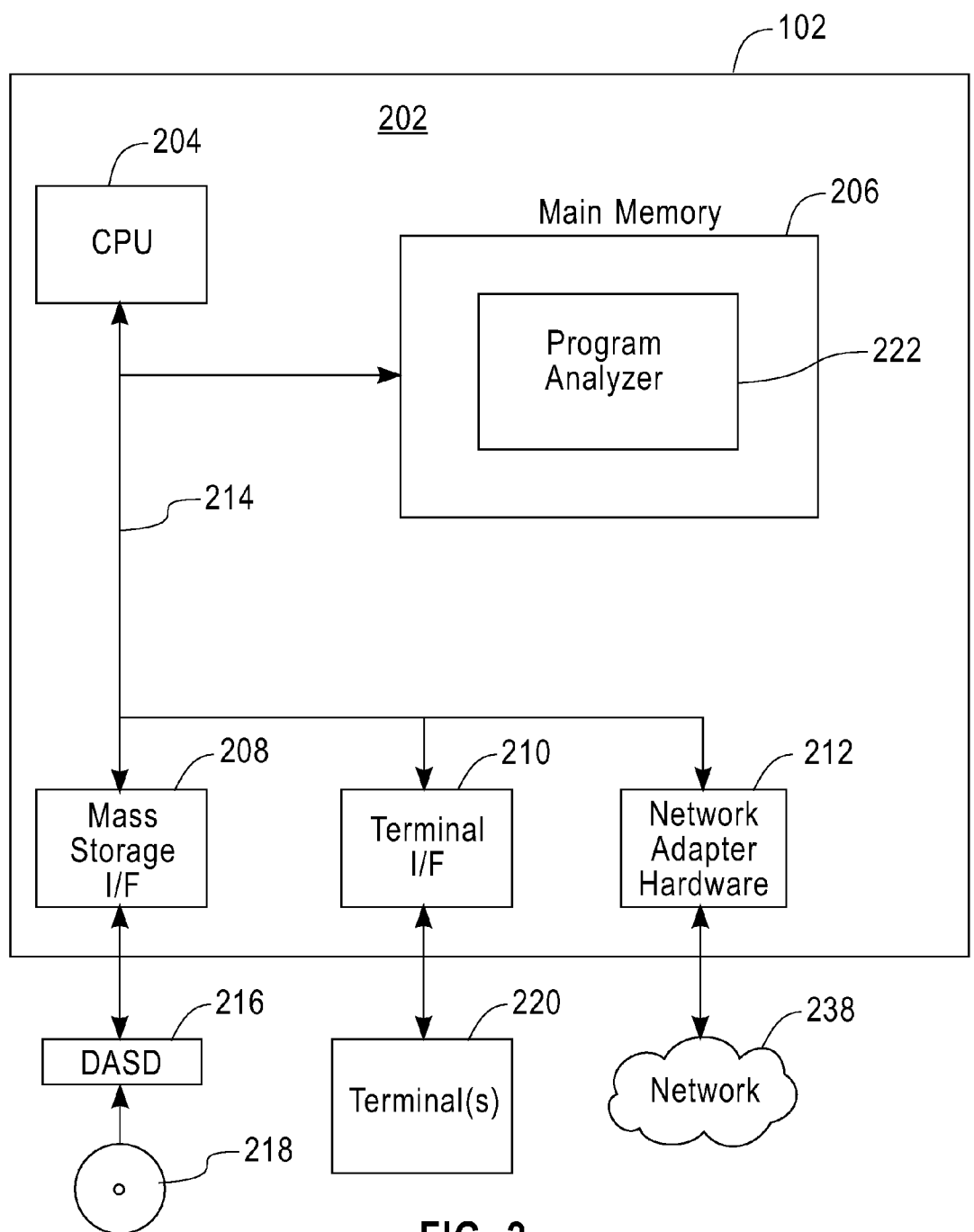
FIG. 2 is a block diagram illustrating a detailed view of an example of an information processing system, according to one embodiment of the present invention.

FIG. 2 is a block diagram illustrating a more detailed view of an information processing system 102 according to an embodiment of the present invention. The information processing system is based upon a suitably configured processing system adapted to implement the particular embodiment of the present invention. Any suitably configured processing system is similarly able to be used as the information processing system 102 by embodiments of the present invention such as an information processing system residing in the computing environment of FIG. 1, a personal computer, workstation, or the like.

The information processing system 102 includes a computer 202. The computer 202 has a processor 204 that is connected to a main memory 206, mass storage interface 208, terminal interface 210, and network adapter hardware 212. A system bus 214 interconnects these system components. The mass storage interface 208 is used to connect mass storage devices, such as data storage device 216, to the information processing system 102. One specific type of data storage device is a computer readable medium such as a floppy disk drive, which may be used to store data to and read data from a CD 218 or a floppy diskette (not shown). Another type of data storage device is a data storage device configured to support, for example, NTFS type file system operations.

The main memory 206, in one embodiment, comprises a program analyzer for dynamically detecting atomic-set serializability violations as discussed in greater detail below. Although illustrated as concurrently resident in the main memory 206, it is clear that respective components of the main memory 206 are not required to be completely resident in the main memory 206 at all times or even at the same time. In one embodiment, the information processing system 102 utilizes conventional virtual addressing mechanisms to allow programs to behave as if they have access to a large, single storage entity, referred to herein as a computer system memory, instead of access to multiple, smaller storage entities such as the main memory 206 and data storage device 216. Note that the term "computer system memory" is used herein to generically refer to the entire virtual memory of the information processing system 102.

Although only one CPU 204 is illustrated for computer 202, computer systems with multiple CPUs can be used equally effectively. Various embodiments of the present invention can further incorporate interfaces that each includes separate, fully programmed microprocessors that are used to off-load processing from the CPU 204. Terminal interface 210 is used to directly connect one or more terminals 220 to computer 202 to provide a user interface to the computer 202. These terminals 220, which are able to be non-intelligent or fully programmable workstations, are used to allow system administrators and users to communicate with the information processing system 102. The terminal 220 can also consist of user interface and peripheral devices that are connected to computer 202 and controlled by terminal interface hardware included in the terminal I/F 210 that includes video adapters and interfaces for keyboards, pointing devices, and the like.

According to the present example, an operating system (not shown) included in the main memory is a suitable multitasking operating system such as the Linux, UNIX, Windows XP, and Windows Server 2001 operating system. Various embodiments of the present invention can use any other suitable operating system. Some embodiments of the present invention utilize architectures, such as an object oriented framework mechanism, that allows instructions of the components of operating system (not shown) to be executed on any processor located within the information processing system 102. The network adapter hardware 212 is used to provide an interface to a network 238. Various embodiments of the present invention can be adapted to work with any data communications connections including present day analog and/or digital techniques or via a future networking mechanism.

Although the examples and illustrated embodiments of the present invention are described in the context of a fully functional computer system, those of ordinary skill in the art will appreciate that various embodiments are capable of being distributed as a program product via CD or DVD, e.g. CD 218, CD ROM, or other form of recordable media, or via any type of electronic transmission mechanism.

Overview of Atomic-Set Serializability According to the Present Invention

The following discussion is a brief overview of atomic-set serializability according to the present invention. As discussed above, the present invention defines atomic-set serializability, which is a more flexible correctness criterion for concurrent programs. Atomic code blocks within atomic-set serializability are serializable only with respect to programmer-specified atomic sets of memory locations. Atomic-set serializability according to the present invention can be used to check for data races (single-location atomic sets), standard notions of serializability (all locations in one atomic set), and a range of options in between.

Atomic-set serializability is based on a new definition of data races which is discussed in greater detail in M. Vaziri, F. Tip, and J. Dolby. Associating synchronization constraints with data in an object-oriented language. In *POPL '06: Conference record of the 33rd ACM SIGPLAN-SIGACT symposium on Principles of programming languages*, pages 334-345, 2006 (hereinafter referred to as "M. Vaziri"), which is hereby incorporated by reference in its entirety. This definition is given in terms of atomic sets and code blocks (called units of work) operating on the atomic sets. The present invention definition of atomic-set serializability encompasses both the traditional notion of a date race (as is further discussed in R. H. B. Netzer and B. P. Miller. What are race conditions?: Some issues and formalizations. *ACM Lett. Program. Lang. Syst.*, 1(1):74-88, 1992, which is hereby incorporated by reference in its entirety) as well as several forms of high-level races such as stale-value errors (See C. Artho, K. Havelund, and A. Biere. Using block-local atomicity to detect stale-value concurrency errors. In *Automated Technology for Verification and Analysis (ATVA '04)*, number 3299 in LNCS, pages 150-164. Springer, 2004 and M. Burrows and K. R. M. Leino. Finding stale-value errors in concurrent programs. *Concurrency and Computation: Practice and Experience*, 16(12):1161-1172, 2004) and inconsistent views (See C. Artho, K. Havelund, and A. Biere. High-level data races. *Journal on Software Testing, Verification and Reliability (STVR)*, 13(4):207-227, 2003). The entire teachings of the above-identified references are hereby incorporated by reference.

The definition states that a race occurs if a program execution exhibits any of a small number of problematic interleaving patterns. The present definition, according to the present invention, is complete in the sense that a program execution that does not exhibit any of these patterns is atomic-set serializable, i.e., equivalent to an execution in which, for each atomic set, the units of work that operate on that set happen in some serial order.

Based on this definition, a data-centric programming model is proposed where correct synchronization is inferred automatically from annotations on fields of classes that hold shared data. One embodiment of the present invention also comprises a dynamic analysis technique that detects violations of atomic-set serializability in existing applications such as Java applications. It should be noted that although the following discussions use Java applications as examples, the present invention is not limited to Java applications. In one embodiment, the dynamic analysis technique is based on the data race definition of M. Vaziri by observing occurrences of the problematic interleaving patterns in actual executions of programs.

In one embodiment of the present invention, the dynamic analysis process for detecting violations of atomic-set serializability utilizes a simple static escape analysis, as discussed in I. Balaban, F. Tip, and R. Fuhrer. Refactoring support for class library migration. *SIGPLAN Not.*, 40(10):265-279, 2005, which is hereby incorporated by reference in its entirety, for detecting which fields of objects may be accessed by multiple threads. The dynamic analysis process also maintains a set of state machines for each shared field that determine to what extent each problematic interleaving pattern has been matched during execution. The dynamic analysis process also instruments the code with yields to encourage problematic interleavings. This optional instrumentation process is a technique known as noise making, as discussed in Y. Ben-Asher, Y. Eytani, E. Farchi, and S. Ur. Noise makers need to know where to be silent—producing schedules that find bugs, in *International Symposium on Leveraging Applications of Formal Methods, Verification and Validation (ISOLA)*, 2006, which is entirely hereby incorporated by reference.

In one embodiment, the dynamic analysis process can be implemented using the Shrike byte code instrumentation component of the WALA program analysis infrastructure, as discussed at T. J. Watson Libraries for Analysis (WALA); http://wala.sourceforge.net/wiki/index.php, which is hereby incorporated by reference in its entirety. It should be noted that this is only one example of how a dynamic analysis process can be implemented according to the present invention, and that it does not limit the present invention in any way.

A heuristic assumption can be made that 1) method boundaries delineate units of work, and 2) the set of all fields of each instance of a class form an atomic set. For each application under consideration, according to one embodiment of the present invention, the byte codes of the application are instrumented in order to 1) intercept accesses to shared data; 2) update the state machines accordingly; and 3) maintain a dynamic call graph to determine the units of work to which these accesses belong. Optimizations are provided that encode the state machines efficiently and minimize the perturbation caused by the execution of the instrumentation code.

In summary, one embodiment of the present invention provides a system and method for detecting atomic-set serializability violations in applications. This example of the present invention follows the generalized definition of data races of M. Vaziri. Due to the completeness result proven in M. Vaziri, the example identifies all atomic-set-serializability violations that appear in a given program execution with respect to given atomic sets and units of work. The example can also be independent of the actual synchronization constructs employed. Therefore, the example of the present invention supports all of the synchronization constructs provided by the libraries such as the java.util.concurrent library that comes with Java 5, such as explicit locks (see, e.g., class java.util.concurrent.locks.ReentrantLock) and synchronizers (e.g., class java.util.concurrent.locks.AbstractQueue Synchronizer).

Previous approaches take the synchronization structure into account, but are limited to Java's traditional synchronized blocks (sometimes augmented by some form of barrier synchronization). In contrast, the example of the present invention finds a documented nondeterministic behavior in method addAll(Collection) of class java.util.concurrent.ArrayBlockingQueue, which uses explicit locks instead of synchronized blocks.

Figure 4:
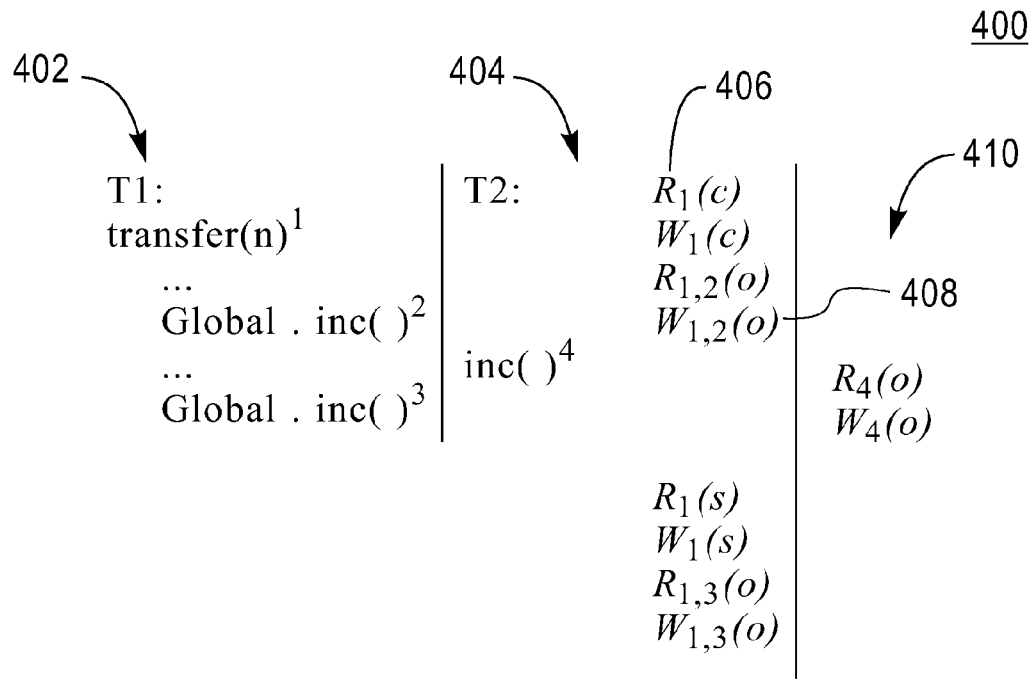
FIG. 4 is a schematic diagram illustrating a schedule comprising two threads.

Comparison of the Atomic-Set Serializability With the Conventional Notions of Serializability The following is a discussion of the atomic-set serializability according to the present invention as compared to conventional notions of serializability. This comparison is discussed with respect to an example as shown in FIG. 3 and FIG. 4. FIG. 3 shows a class Account that declares fields checking and savings, as well as a method transfer( ) that models the transfer of money from one to the other. Also shown is a class Global that declares a field opCounter that counts the number of transactions that have taken place. For the purposes of this example, it is assumed that the programmer intends the following behavior. It is not possible for threads to observe intermediate states in which the deposit to checking has taken place without the accompanying withdrawal from savings. Also, it is assumed that concurrent executions of inc( ) are allowed, and that the transaction counter opCount is to be updated atomically.

To this end, transfer( ) and inc( ) are protected by separate locks, which is accomplished by making each of these methods synchronized. FIG. 4 shows a schedule 400 in which two threads, T1 402 and T2 404, concurrently execute the transfer( ) and inc( ) methods, respectively. As shown, the execution of method inc( ) by T2 402 occurs interleaved between the execution of the two calls to inc( ) by T1 402. For convenience, each method execution has been labeled with a distinct number (1 through 4).

FIG. 4 also provides further detail on this schedule. For example, FIG. 4 shows the read (R) and write (W) events performed on the fields checking (c), savings (s), and opCounter (o) during the execution of each method. Each such event is labeled with the sequence of labels corresponding to the methods that are on the call stack during its execution. For example, $R_1(c)$ 406 indicates the read of field checking during the execution of transfer( ), and $W_{1,2}(o)$ 408 denotes the write of field opCount during the first execution of inc( ) that was invoked from transfer( ).

Given that savings and checking are to be updated atomically, method transfer is an atomic section or a transaction. Lipton's theory of reduction, as discussed in R. J. Lipton. Reduction: a method of proving properties of parallel programs. *Commun. ACM*, 18(12):717-721, 1975, which is hereby incorporated by reference in its entirety, is defined in terms of right-movers and left-movers. An action b is a right-mover if, for any execution where the action b performed by one thread is immediately followed by an action c performed by a concurrent thread, The actions b and c can be swapped without changing the resulting state, as discussed in C. Flanagan and S. N. Freund. Atomizer: a dynamic atomicity checker for multithreaded programs. In *POPL '04: Proceedings of the 31st ACM SIGPLAN-SIGACT symposium on Principles of programming languages*, pages 256-267, 2004. In this theory, lock acquires are right-movers, and lock releases are left-movers. Shared variables that are consistently protected by some lock are both-movers, and variables that are not consistently protected by some lock are non-movers.

The pattern consisting of a sequence of right movers, followed by at most one non-mover, followed by a sequence of left movers can be reduced to an equivalent serial execution. However, the method transfer( ) of FIG. 3 corresponds to the following sequence: a right-mover (the lock acquire at the beginning of transfer( )[1]), two both-movers (the read/write to field checking), a right mover (the lock acquire at the beginning of inc( )²), two both-movers (the read/write to field inc), a left mover (the lock release at the beginning of inc( )²), two both-movers (the read/write to field savings), a right mover (the lock acquire at the beginning of inc( )³), two both-movers (the read/write to field inc), a left mover (the lock release at the end of inc( )³), and a left mover (the lock release at the end of transfer( )¹). Hence, according to Lipton's theory, the method transfer( ) of FIG. 3 is not equivalent to a serial execution. Therefore, the theory cannot show that the transfer between the checking and savings memory locations is performed atomically.

Two events that are executed by different threads are considered a conflicting pair if they operate on the same location and one of them is a write. Two traces are conflict-equivalent (as discussed in P. Bernstein, V. Hadzilacos, and N. Goodman. *Concurrency Control and Recovery in Database Systems*. Addison-Wesley, 1987, which is hereby incorporated by reference in its entirety and L. Wang and S. D. Stoller. Accurate and efficient runtime detection of atomicity errors in concurrent programs. In *Proceedings of the ACM SIGPLAN Symposium on Principles and Practice of Parallel Programming*, (PPoPP '06), pages 137-146, New York, N.Y., 2006) if and only if they include the same events, and for each pair of conflicting events, the two events appear in the same order. A trace is conflict-serializable if and only if it is conflict-equivalent to a serial trace. For the threads in FIG. 4, there exist two serial schedules 502, 504, as shown in FIG. 5 (again assuming that transfer( ) needs to be a transaction).

Figure 5:
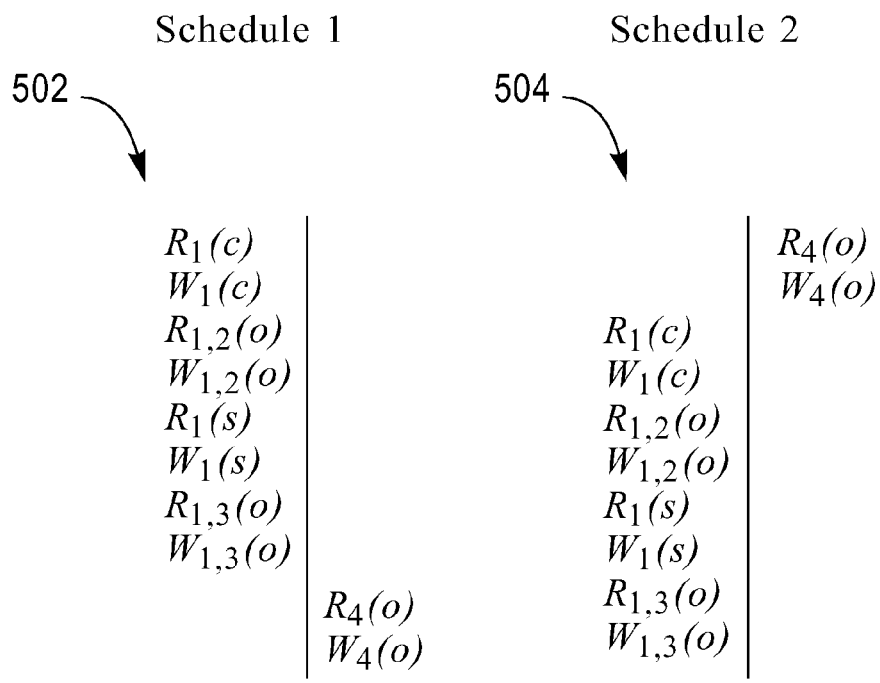
FIG. 5 is a schematic diagram illustrating serial schedules for the program of FIG. 3.

The schedule 410 of FIG. 4 is not conflict-serializable because it is not conflict-equivalent to either of the two serial schedules of FIG. 5 by the following reasoning. 1) The pairs of conflicting events include: ($R_{1,2}(o)$, $W_4(o)$), ($R_{1,3}(o)$, $W_4(o)$), ($W_{1,2}(o)$, $R_4(o)$), and ($W_{1,3}(o)$, $R_4(o)$). 2) In order for the schedule 410 of FIG. 4 to be conflict-equivalent with the first serial schedule 502 of FIG. 5 both $R_{1,2}(o)$ and $R_{1,3}(o)$ need to occur before $W_4(o)$, and both $W_{1,2}(o)$ and $W_{1,3}(o)$ need to occur before $R_4(o)$, however, this is not the case. 3) In order for the schedule 410 of FIG. 4 to be conflict-equivalent with the second serial schedule 504 of FIG. 5 both $R_{1,2}(o)$ and $R_{1,3}(o)$ need to occur after $W_4(o)$, and both $W_{1,2}(o)$ and $W_{1,3}(o)$ need to occur after $R_4(o)$, however this is not the case. Therefore, the schedule 410 of FIG. 4 is not conflict-serializable.

Two schedules are view-equivalent if 1) they include the same events; 2) each read operation reads the result of the same write operation in both schedules; and 3) both schedules have the same final write for any location. A schedule is view-serializable if it is view-equivalent to a serial schedule. It is easy to see that the schedule 410 of FIG. 4 is not view-equivalent to the serial schedule 502 of FIG. 5 because in that serial schedule 502, $R_4(o)$ reads from $W_{1,3}(o)$, whereas in the schedule 410 of FIG. 4 it reads from $W_{1,2}(o)$.

Likewise, the schedule 410 of FIG. 4 is not view-equivalent to the serial schedule 504 of FIG. 5 because in that serial schedule 504, $R_{1,3}(o)$ reads from $W_{1,2}(o)$, whereas in the schedule 410 of FIG. 4 it reads from $W_4(o)$. Therefore, the schedule 410 of FIG. 4 is not view-serializable. View-serializability and conflict-serializability differ on how they treat blind writes only, i.e. when a transaction writes a location without a prior read. Conflict-serializability implies view-serializability.

The following is a brief discussion on atomic-set serializability according to the present invention. In one embodiment, the present invention assumes the existence of programmer-specified atomic sets of locations that are to be updated consistently, and units of work, logical operations on shared data that preserve consistency when executed sequentially. Given the assumption stated above (it is not possible for threads to observe intermediate states in which the deposit to checking has taken place without the accompanying withdrawal from savings), it is assumed that checking and savings form an atomic set $S_1$, and that transfer( )₁ is a unit of work on $S_1$. Moreover, from the second assumption stated above (it is assumed that concurrent executions of inc( ) are allowed, and that the transaction counter opCount is to be updated atomically), it can be inferred that opCounter is another atomic set $S_2$ and Global.inc( )², Global.inc( )³, and Global.inc( )⁴ are units of work on $S_2$. Atomic-set serializability is equivalent to conflict serializability after projecting the original schedule onto each atomic set, i.e., only events from one atomic set are included when determining conflicts.

The projection of the schedule 410 of FIG. 4 onto atomic set $S_1$ comprises the following sequence of events. $R_1(c)W1(c)R_1(s)W1(s)$. This is trivially serial, because the events from only one thread are included. Furthermore, the projection of the schedule 410 of FIG. 4 onto atomic set $S_2$ is: $R_{1,2}(o)W_{1,2}(o)R4(o)W4(o)R_{1,3}(o)W_{1,3}(o)$ is also serial because the events of units of work Global.inc( )², Global.inc( )³, and Global.inc( )⁴ are not interleaved. Therefore, the schedule 410 of FIG. 4 is atomic-set serializable.

In summary, atomic-set serializability provides a more fine-grained correctness criterion for concurrent systems than the traditional notions of Lipton-style atomicity, conflict-serializability, and view-serializability. In practice, atomicity and conflict-view-serializability would classify the schedule 410 of FIG. 4 as having a bug, but atomic-set serializability correctly reveals that there is none.

Formal Model

The following is a dynamic formal model of code in terms of sequences of accesses to memory locations, atomic sets, and units of work. Let $\mathcal{L}$ be the set of all memory locations. A subset $L \subseteq \mathcal{L}$ may be designated as an atomic set, indicating that a consistency property exists between those fields, without specifying the property itself. Because of this property, all elements of such a set are to be updated atomically. An event is an access to a memory location $l \in L$ for some atomic set L. Accesses can be a read R (l) or a write W (l). It is assumed that each access to a single memory location is uninterrupted. If l denotes locations $l_1$ or $l_2$ in L, the notation L−l can be used to denote the other location. The notation loc(e) denotes the location accessed in e.

A unit of work u is a sequence of events, and is declared on a set of atomic sets. Sets(u) are written for the set of atomic sets corresponding to $U_{L \in sets(u)}L$ is the dynamic atomic set of u. Units of work may be nested, and u←u' is written to indicate that u' is nested in u. Units of work form a forest via the ←relation. An access to a location $l \in L$ appearing in unit of work u belongs to the top-most (with respect to the ←forest) unit of work within u such that L∈sets(u). The notation $R_u(l)$ denotes a read belonging to u, and similarly for writes. So if a method foo calls another method bar, where both are declared units of work for the atomic set $L_1$ and bar reads a location $l \in L_1$ in bar, then this read belongs to foo, as foo ←bar.

A thread is a sequence of units of work. The notation thread(u) denotes the thread corresponding to u. An execution is a sequence of events from one or more threads. Given an execution E and an atomic set L, the projection of E on L is an execution that has every event on L in E in the same order.

An interleaving scenario is a sequence of events that originate from two or more threads. For example, $R_u(l)W_u(l)W_u(l)$ is an interleaving scenario where unit of work u first reads l, then another unit of work u' performs a write, followed by a write by u. An execution is in accordance with an interleaving scenario if it includes the events in the interleaving scenario, and these appear in the same order. The atomic sets of an execution E, atomicSets(E), comprise all atomic sets for which there is an access in E, as well as the dynamic atomic set of all units of work in E. When the execution is clear from context, atomicSets is written.

FIG. 6 shows data access patterns that are non-serializable. Serializability is obtained by preserving data consistency, so these scenarios capture when the data may be read or written inconsistently. A definition for data races is as follows. Let L be an atomic set of locations, $l_1, l_2 \in L$, l one of $l_1$ or $l_2$, and u and u' two units of work for L, such that thread(u)≠thread(u'). An execution has a data race, as determined according to one embodiment of the present invention, if it is in accordance with one of the data access patterns of FIG. 6.

The dynamic analysis of the present invention detects all atomic-set serializability violations that arise in a particular execution. The scenarios in FIG. 6 are complete; meaning that any execution that does not include any of these scenarios is atomic-set serializable (See M. Vaziri for a proof). However, this completeness result is only valid if every unit of work, that writes at least one element of an atomic set, writes the entire atomic set. This restriction can be circumvented with dummy writes: at the end of any unit of work that wrote at least one element of an atomic set, one adds writes to all the other elements of that atomic set. These dummy writes synthetically write the last value written to the corresponding location. This represents the fact that the unit of work reestablished the invariant on the atomic set with that value.

Even though writing the same value again may seem to be redundant, these writes are a prerequisite to the proof of completeness. It is very easy to construct an example, where the trace without the dummy writes does not display any problematic interleaving scenario, but the class invariant is clearly violated. In FIG. 7, there are two threads 702, 704, each checking a condition that ensures the invariant x+z<10 is retained after executing the statement in its then branch. If each thread 702, 704 is executed atomically, the class invariant is not violated. But if both threads 702, 704 execute the test first, then one thread updates one variable followed by the other thread, the invariant is violated, with $x=6 \wedge y=6 \Rightarrow x+y > 10$.

The interleaving scenario (without dummy writes) is (assuming the value of the variable to be updated is cached):

$$R_{u1}(x) R_{u1}(y), R_{u2}(x), R_{u2}(y), W_{u1}(x), W_{u2}(y)$$

which shows none of the problematic data access patterns, but is not serializable: $Wu_1(x)$ is in conflict with $Ru_2(x)$, so $u_1$ cannot execute as a whole before $u_2$. $Ru_1(y)$ is in conflict with $Wu_2(y)$, so $u_1$ cannot execute after $u_2$ either. Adding dummy writes, one gets:

$$R_{u1}(x), R_{u1}(y), \underline{R_{u2}(x)}, \overline{R_{u2}(y)}, W_{u1}(x), W_{u1}(y),$$

$$\underline{W_{u2}(x)}, \overline{W_{u2}(y)}$$

where problematic data access patterns are under-/over-lined. If the value of the variable to be updated is not cached in a local variable but read again from the field, the result is a high-level race (underlined), revealing that there is a problem regarding both variables:

$$R_{u1}(x), \underline{R_{u1}(y)}, R_{u2}(x), R_{u2}(y), R_{u2}(y),$$

$$\underline{W_{u2}(y), W_{u2}(x), R_{u1}(x), W_{u1}(x), W_{u1}(y)} \quad (1)$$

Serializability Violation Detection

The following is a more detailed discussion on the dynamic detection of atomic-set serializability violations, based on the new definition of data race discussed above. It is assumed that there is an execution E (a sequence of read and write events as presented in the dynamic model above). In one embodiment, the present invention constructs a set of race automata that are used to match the problematic interleaving patterns of FIG. 6 during program execution. To illustrate this, consider again the execution of the interleaving scenario 1 of FIG. 6 for the program illustrated in FIG. 7:

$$R_{u1}(x), \underline{R_{u1}(y)}, R_{u2}(x), R_{u2}(y), R_{u2}(y),$$

$$\underline{W_{u2}(y), W_{u2}(x), R_{u1}(x), W_{u1}(x), W_{u1}(y)}$$

The automaton depicted at time $T_1$ of FIG. 8 detects a high-level data race corresponding to pattern 9 of FIG. 6 in this execution (a single execution may exhibit occurrences of multiple patterns. As an example, note that the execution discussed above also matches pattern 2 of FIG. 6, where pattern variables u,u' are bound to u1, u2, and x, respectively), as is indicated by underlining. Here, the units of work u1 and u2 of the example are bound to variables u,u' in the pattern, and the locations y and x in the example are bound to pattern variables $l_1$ and $l_2$, respectively.

Each race automaton has a start node that represents the state in which no event of the pattern has been matched yet. The start node is connected by an edge labeled with the first event of the pattern to another node, and has a self-loop for all other events. The same principle is applied to the new node recursively, so that a chain of nodes connected by edges labeled with the events in the pattern is obtained. The last node of this chain represents the accept state in which the entire pattern has been matched. An accepting state represents finding a problematic interleaving scenario in the execution, and results in the issuance of a warning. The automaton depicted at $T_1$ stays in state number 0 after the first event in the trace, which does not match any event in the pattern, and transitions to state 1 when it observes the second event at $T_2$. Events 3 to 5 do not change the state, but then each subsequent event transitions the automaton to the next state, resulting in "accepting" the pattern after observing $Ru_1(x)$ (See times $T_3$ to $T_5$).

It should be noted that thus far, it has been discussed how a race automaton is constructed that matches a specific pattern, and for a given binding of units of work and locations to pattern variables. According to the present example, there are 14 patterns that are to be matched simultaneously (FIG. 6 shows 11 patterns, but note that patterns 6, 8, and 9, each allow two symmetric alternatives). In addition, for each pair of l and l', there are two ways of matching them against two program locations, and likewise, there are two ways of matching the units of work u and u' against observed units of work in the execution. Therefore, the 14 automata discussed above are constructed for each tuple t∈U×U×L×L. The corresponding automata $(Q^i, \Sigma, \delta^i, S_0^i, F^i)$ are defined as follows. For each scenario, $i, Q^i$ includes states $S_j^i$ representing that exactly j events of the scenario have already been detected, including the accepting state $F^i$. The input alphabet $\Sigma$ is the union of all events traceable $$\sum = \bigcup_{u \in U, l \in \ell} \{R_u(l), W_u(l)\},$$

and the transition function $\delta^i: Q^i \times \Sigma \to Q^i$ is defined as follows:

$$\delta^i(S_j^i, e) = \begin{cases} S_{j+1}^i, & \text{if } e \text{ is the event of scenario } i \\ S_j^i, & \text{else} \end{cases}$$

Conceptually, when an event e∈E is processed, all the automata for all quadruples q∈{(u1,u2,l1,l2)|unit(e)∈{u1, u2}∧thread(u1)≠thread(u2)∧loc(e)∈{l1,l2}} need to be updated. While this may in principle use an enormous amount of space and processing time, the implementation techniques and optimizations discussed in greater detail below make this approach quite feasible in practice.

As discussed above the dynamic analysis of the present invention makes heuristic assumptions to determine two fundamental structures in the analysis: the atomic sets and the initial units of work declared on each atomic set. It is assumed that all non-final, non-volatile instance members of a class (including inherited instance members) are members of a single atomic set. All non-static public and protected methods in this class and its super classes are considered initial units of work declared on this atomic set (since units of work are determined for a specific instance, it is impossible for a subclass' method to be invoked).

There is another atomic set for all non-final, nonvolatile static fields of a class. All public and protected methods of that class are initial units of work declared on this atomic set. These heuristics are in general too conservative as there might be several invariants for non-intersecting parts of these atomic sets that are protected by different locks. However, these coarse granular atomic sets are appropriate, as they, in general, exhibit all the concurrency problems of the given class. But there might also exist invariants between even larger sets of fields, e.g. due to suboptimal design. M. Vaziri, states the following condition: it is assumed that each access to a member of an atomic set is done within a unit of work declared on that atomic set (See M. Vaziri, at Section 4.1). In order to fulfill this requirement, the initial units of work are not sufficient. Two additional cases exist where the association between units of work and atomic sets needs to be altered.

If a method in a class is found that directly accesses a field which it is not an initial unit for, then that unit (and all enclosing units of work) is declared an additional unit for the atomic set the field is contained in. The logic behind this is that when a unit operates directly on a data structure, it is usually meant to perform a transaction on it. Associating the atomic set with the unit of work makes sure that this unit of work is serializable with respect to other units of work on all atomic sets it is declared on. If the accessed field belongs to a method parameter, this measure is equivalent to a unit for declaration as discussed in M. Vaziri.

As another condition, a unit of work declared on multiple atomic sets needs to be a unit of work on the union of them. This requirement is accounted for as well. So if a unit of work is declared an additional unit of work due to direct field access, its original atomic set, and the additional atomic set are merged. These heuristics have been found very effective. They deal correctly with a huge number of access patterns in programs such as Java programs, most prominently (anonymous) inner classes. However, it is not safe in all cases: Consider a method executing a transaction on a data structure that it is not initially a unit for (e.g., a data structure declared in another class). If access to that data structure is done using public accessor methods, means of detecting that the calling method should be declared a unit of work for the accessed data structure are not pursued. It could as well perform individual transactions on it.

As discussed above, the worst case space-complexity of a reckless implementation of this algorithm is in $O(n^2 \times |L|^2 \times 14)$, where n is the number of units of work (approximated by the number of methods in the program) and $|L|$ is the number of memory locations accessed in the heap through field reads/writes. While the constant 14 (the number of patterns) can be abstracted away in the O-notation, it does matter for implementation purposes, as the other factors might be large. A sparse bit set representation of the state machines can be chosen, where all 14 states are encoded in a single long value. Still, the other two factors might be huge, so more aggressive optimizations are utilized.

Another problem is that for a dynamic analysis, the units of work that might occur and the locations in L are unknown a-priori. To overcome this problem and to encode tuples efficiently, one embodiment of the present invention allows abbreviated quadruples. There are two kinds of abbreviated tuples: A tuple of the form (u,l) denotes the equivalence class of all tuples $U_{u' \in U, l' \in \pm}(u,u',l,l')$, while the triple (u1,u2,l) represents the equivalence class $U_{l' \in \pm}(u,u2,l,l')$, respectively.

These abbreviations are a natural encoding for the patterns' lifecycles. Consider the execution 1 again: After receiving the first event ($Ru_1(x)$), all that is known is that if this event is the first event in a pattern, then u=u1 and $l_1$=l=x. Providing a mapping for u' and $l_2$ is not yet possible. A single tuple (u1,x) encodes all possible future mappings. More information is added to the tuples on-the-fly as the execution is processed to save processing time and memory. A typical life-cycle of the tuples looks like that: the first event specifies only a unit of work u and a location l, so the state machines are initialized for the tuple (u,l). When another event E arrives where loc (E)=l and u'=thread(E)≠thread(u) (in all the scenarios the second event must be of a different thread), the states of (u,l) are copied to a new tuple (u,u',l) and subsequently updated.

Another event E' may lead to a new tuple (u,u',l,l'), if unit (E')∈{u,u'} and l'≠loc(E) for which the states are again copied and updated. One needs to be careful, however, that the extended tuples could already be present in the analysis (produced by another event), in which case the states are not to be copied. The analysis updates the states for the extended tuple instead. If one of the state machines reaches an accepting state, the violation is presented to the user.

The state machines for a tuple (u1,u2,l1,l2) or (u1,u2,l1) cannot make any more progress after both units of work u1 and u2 have been completed. The state machines for the tuples (u1,l1) cannot go to a terminating state either, when u1 has been completed, as any pattern in FIG. 6 that an event of u after an event of u' has been witnessed. So even if there is another unit u' working on l, the patterns can never be terminated without more events from u. So these tuples and their state machines can be discarded upon the corresponding unit(s) termination, which reduces space consumption dramatically. Because of these optimizations, the analysis' worst case complexity stated at the beginning of this section will usually not be hit, as units of work are typically short.

To gain all the information mentioned in the last sections, the present invention, in one embodiment instruments the program's byte code with the Shrike byte code instrumentation component of the WALA program analysis infrastructure. As stated above, this is only one example of an instrumentation that is applicable to the present invention and does not limit the present invention in any way. There are two classes of information interest: First, a dynamic call graph is tracked, which is essentially the stack trace for each called method, to determine the units of work. Second, access to shared data is instrumented and inserted into an event queue that represents the program execution.

To maintain the dynamic call graph, method entry and exit points are instrumented. When entering or exiting a method, this change is reflected in a thread-local call-stack. To detect library callbacks, invocation points in the program and compare the invocation's target to the invoked method at the entry. If the target and the called method do not match, a callback has been detected, in which the present invention starts a new unit of work in the called method.

Instrumenting method exit points allows one embodiment of the present invention to add dummy writes at the end of a unit of work. This is an optional feature, but with dummy writes turned on, the dynamic analysis algorithm finds all atomic-set serializability violations in the program's trace. Apart from the call graph, instrumentation is used to intercept access to shared data. Possibly shared fields are determined with a simple static escape analysis. This analysis determines a conservative set of possibly-escaping fields by computing the set of all types that are transitively reachable from a static field or are passed to a thread constructor (covering both explicit constructor parameters and uses within) thread or runnable methods of state defined in an enclosing scope. All non-final and non-volatile fields of such types are instrumented. The location for static field access is the fully qualified field name, for instance field access it consists of the target object and the fully qualified field name.

In addition, one embodiment of the present invention instruments array access byte codes since arrays are Objects in Java and thus might be shared. There are two modes for array locations: Either the whole array is treated as one big location or else each index becomes a location of its own. The first choice is obviously safe and produces less overhead for checking the problematic patterns but may result in false positives, while the second approach might result in a huge slow-down of our algorithm. As the escape analysis currently does not cover array accesses, the first approach, in one embodiment, can be utilized. If races are reported with this setting, the program run is repeated with the detailed array trace.

In contrast to the call graph, access to shared data cannot be stored in thread-local data structures. The present invention, according to one embodiment, employs a concurrent, non-blocking queue (similar to B. Goetz, T. Peierls, J. Bloch, J. Bowbeer, D. Holmes, and D. Lea. *Java Concurrency in Practice*. Addison Wesley Professional, May 2006 Section 15.4.2, which is hereby incorporated by reference in its entirety) to store the events of different threads, which guarantees that no user-thread has to wait because of trace collection. Furthermore it timestamps the events in a sequential order which is a prerequisite for detecting the problematic interleaving scenarios. A non-blocking queue can be selected to keep the probe effect (i.e., changes to the system's behavior due to observation) as low as possible as discussed in J. Gait. A probe effect in concurrent programs. *Software:Practice and Experience*, 16(3):225-233, 1986, which is hereby incorporated by reference in its entirety. Since, under contention, a blocking queue shows degraded performance due to context-switch overhead and scheduling delays.

There is, however, no guarantee that the events are traced in the same order they access the memory, without adding additional synchronization, which adds a significant probe effect and slows down the execution enormously. The field access and the subsequent insertion of the event into the event queue are not atomic with respect to other events. A possible interleaving can be that one thread (t1) accesses a location l1, and then the scheduler runs another tread (t2), accessing l2 and inserting this access into the event queue. Later t1 resumes execution and inserts its access into the queue. The real execution is thus l1,l2 but the trace contains l2,l1. The probability of this scenario depends on the hardware, but any such order still represents a possible execution of the program. This is because the code recording the events happens as part of the thread doing the access at the same points as the accesses themselves. Hence, any synchronization that applies to the access also applies to the recording. So, any reordering that occurs in the recording is consistent with the constraints of thread synchronization and hence a valid execution.

The detection algorithm is located in a separate thread to remove the need for additional synchronization. It regularly polls the event queue and processes the event as discussed above. This means that the detection is usually post-mortem, when the race has already happened. However, the dynamic analysis can also run on-the-fly (with extra synchronization needed) or offline (when storing the event queue on disk). As an option, according to one embodiment of the present invention, our instrument adds yields at certain points in the program to achieve more interleavings. This technique is called noise making in which Ben-Asher et al. found that with a more elaborate noise strategy, the probability of producing a bug increases considerably.

Process of Dynamically Detecting Atomic-Set Serializability Violations

Figure 9:
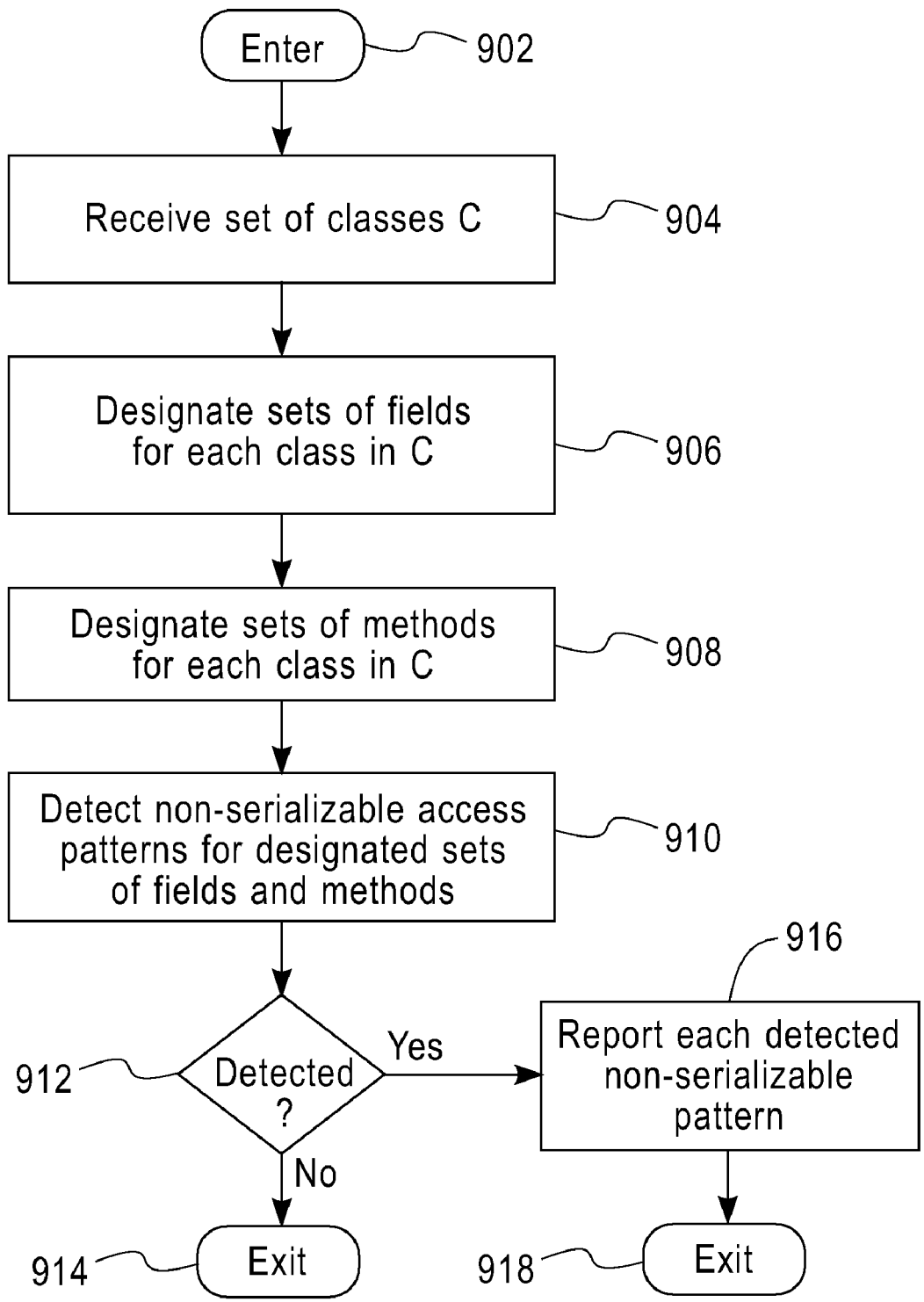
FIG. 9 is an operational flow diagram illustrating a process of dynamically detecting atomic-set serializability violations according to an embodiment of the present invention.

FIG. 9 is an operational flow diagram illustrating a process of dynamically detecting atomic-set serializability violations. The operational flow diagram of FIG. 9 begins at step 902 and flows directly to step 904. The program analyzer 222, at step 904, receives a set of classes associated with a program. The program analyzer 222, at step 906, identifies sets of fields for each class in the set of classes. A set of methods, at step 908, are identified for each class in the set of classes. The program analyzer 222, at step 910, detects non-serializable access patterns for the identified sets of fields and methods. The program analyzer 222, at step 912, determines if non-serializable patterns have been detected. If the result of this determination is negative, the control flow exits at step 914. If the result of this determination is positive, the program analyzer 222, at step 916, reports each detected non-serializable pattern to a user. The control flow then exits at step 918.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for detecting atomic-set serializability violations in an execution of a program, the method comprising:

identifying a set of classes associated with a program to be analyzed, the set of classes comprising a set of fields;

selecting at least one subset of fields in the set of fields in the identified classes;

selecting a set of code fragments associated with an execution of the program;

observing a set of data accesses in the selected set of code fragments;

detecting, based on the observing, a set of data access patterns based on a behavior of the set of data accesses; and determining, based on the set of data access patterns that have been detected, if the selected set of code fragments is serializable for each selected subset of fields, wherein a set of code fragments that is serializable at least preserves data consistency.

2. The method of claim 1, wherein the selecting the at least one subset of fields is based on heuristic assumptions.

3. The method of claim 1, wherein the identifying the set of code fragments in the program is based on heuristic assumptions.

4. The method of claim 1, wherein detecting the set of data access patterns further comprises:
detecting non-serializable data access patterns associated with the selected subset of fields.

5. The method of claim 1, wherein the selected subsets of fields comprise atomic sets of memory locations.

6. The method of claim 5, wherein each code fragment in the selected code fragments is a unit of work on an atomic set, and wherein such unit of work is an operation that preserves consistency of the atomic set.

7. The method of claim 1, wherein the determining further comprises:
instrumenting a set of bytecodes associated with the program;
providing at least one state machine associated with a set of problematic data access patterns;
detecting, using the instrumented set of byte codes, program accesses to shared data;
updating, in response to the detecting and to a determination that such an update is necessary, the at least one state machine; and
determining that an execution of the program matches one of the problematic data access patterns in the set of problematic data access patterns, when one of the at least one state machine reaches its final state.

8. An information processing system, for detecting atomic-set serializability violations in an execution of a program, the system comprising:
a processor;
a memory, communicatively coupled to the processor; and
a program analyzer, communicatively coupled to the memory and the processor, the program analyzer configured to:
identify a set of classes associated with a program to be analyzed, the set of classes comprising a set of fields;
select at least one subset of fields in the set of fields in the identified classes;
select a set of code fragments associated with an execution of the program;
observe a set of data accesses in the selected set of code fragments;
detect, based on the set of data accesses being observed, a set of data access patterns based on a behavior of the set of data accesses; and
determine, based on the set of data access patterns that have been detected, if the selected set of code fragments is serializable for each selected subset of fields, wherein a set of code fragments that is serializable at least preserves data consistency.

9. The information processing system of claim 8, wherein the selecting the at least one subset of fields is based on heuristic assumptions.

10. The information processing system of claim 8, wherein the identifying the set of code fragments in the program is based on heuristic assumptions.

11. The information processing system of claim 8, wherein the program analyzer is further configured to detect by:
detecting non-serializable data access patterns associated with the selected subset of fields.

12. The information processing system of claim 11, further comprising:
a user interface, communicatively coupled with the processor, the memory, and the program analyzer, adapted to report the detected non-serializable data access patterns to a user via the user interface.

13. The information processing system of claim 8, wherein the program analyzer being further adapted to:
instrument a set of bytecodes associated with the program;
provide at least one state machine associated with a set of problematic data access patterns;
detect, using the instrumented set of byte codes, program accesses to shared data;
update, in response to the detecting and to a determination that such an update is necessary, the at least one state machine; and
determine that an execution of the program matches one of the problematic data access patterns in the set of problematic data access patterns, when one of the at least one state machine reaches its final state.

14. A computer readable medium comprising computer instructions for performing, with an information processing system, a method for detecting atomic-set serializability violations in an execution of a program, the method comprising:
identifying a set of classes associated with a program to be analyzed, the set of classes comprising a set of fields;
selecting at least one subset of fields in the set of fields in the identified classes;
selecting a set of code fragments associated with an execution of the program;
observing a set of data accesses in the selected set of code fragments;
detecting, based on the observing, a set of data access patterns based on a behavior of the set of data accesses; and
determining, based on the set of data access patterns that have been detected, if the selected set of code fragments is serializable for each selected subset of fields, wherein a set of code fragments that is serializable at least preserves data consistency.

15. The computer readable medium of claim 14, wherein the selecting the at least one subset of fields is based on heuristic assumptions.

16. The method of claim 14, wherein the identifying the set of code fragments in the program is based on heuristic assumptions.

17. The computer readable medium of claim 14, wherein the detecting further comprises:
detecting non-serializable data access patterns associated with the selected subset of fields.

18. The computer readable medium of claim 14, wherein the determining further comprises:
instrumenting a set of bytecodes associated with the program;
providing at least one state machine associated with a set of problematic data access patterns;
detecting, using the instrumented set of byte codes, program accesses to shared data;
updating, in response to the detecting and to a determination that such an update is necessary, the at least one state machine; and
determining that an execution of the program matches one of the problematic data access patterns in the set of problematic data access patterns, when one of the at least one state machine reaches its final state.

19. The computer readable medium of claim 14, wherein the selected subsets of fields comprise atomic sets of memory locations.

20. The computer readable medium of claim 14, wherein each code fragment in the selected code fragments is a unit of work on an atomic set, and wherein such unit of work is an operation that preserves consistency of the atomic set.

* * * * *